May 3, 1966 R. K. BOOHER 3,249,747

CARRY ASSIMILATING SYSTEM

Filed June 14, 1963 4 Sheets-Sheet 1

INVENTOR.
ROBERT K. BOOHER

BY A. M. Fernandez

ATTORNEY

May 3, 1966 R. K. BOOHER 3,249,747

CARRY ASSIMILATING SYSTEM

Filed June 14, 1963 4 Sheets-Sheet 2

INVENTOR.
ROBERT K. BOOHER

BY A. M. Fernandez

ATTORNEY

INVENTOR.
ROBERT K. BOOHER
BY U. M. Fernandez
ATTORNEY

INVENTOR.
ROBERT K. BOOHER
BY A. M. Fernandez
ATTORNEY

United States Patent Office 3,249,747

Patented May 3, 1966

3,249,747

CARRY ASSIMILATING SYSTEM

Robert K. Booher, Downey, Calif., assignor to North American Aviation, Inc.

Filed June 14, 1963, Ser. No. 287,831
14 Claims. (Cl. 235—175)

This invention relates to improvements in parallel arithmetic units of the type having a separate carry, or separate carry and borrow, storage, and more particularly to an improved system for assimilating the result of an additive operation with its separately stored carry or the result of a subtractive operation with its separately stored borrow.

The speed of parallel arithmetic operations has been limited in the past by the propagation of carry digits. To increase speed, parallel logic networks have been devised which generate all carries simultaneously, the carry of a given order being generated as a function of all lower order augend and addend digits. Since the logic network expands for each successive higher order to include all of the terms for the generation of lower order carries, the simultaneous generation of all carries in that manner has the disadvantage of high costs.

A compromise between the fast but expensive simultaneous generation of all carries and the slow but inexpensive sequential generation of carries in a parallel adder is the generation of auxiliary carry functions as described by A. Weinberger and J. L. Smith in a National Bureau of Standards Circular 591, Sec. 1, issued February 14, 1958. According to that Circular, a carry $C_4$ generated simultaneously with carries $C_1$ to $C_3$ is used as an auxiliary function to generate simultaneously the carries $C_5$ to $C_8$ during a following clock phase. The next group of carries $C_9$ to $C_{12}$ are then formed as a function of the carry $C_8$ during a subsequent clock phase. In that manner carries are generated simultaneously within groups and sequentially between groups. However, such a compromise incompletely satisfies the need for speed.

It has been recognized in the past that most operations in a computer are performed by additive and substractive operations and that the time required to propagate carries and borrows can be avoided by forming and separately storing the carries which are assimilated with the result of the operation only at the conclusion of the sequence of additive or subtractive operations. The result of an additive operation is referred to herein as a pseudo-sum having separately stored carries. Similarly, the result of a subtractive operation is a pseudo-difference having separately stored borrows.

An object of this invention is to provide improvements in an adder which operates in an unassimilated-carry mode.

Another object is to provide improvements in a subtractor which operates in an unassimilated-borrow mode.

Another object is to provide a fast and economical system for assimilating separately stored carries with a pseudo-sum or for assimilating separately stored borrows with a pseudo-difference.

Still another object is to provide an unassimilated-carry adder in which all carries are positive.

These and other objects of the invention are achieved by providing two registers A and C in which an addend and augend (or pseudo-sum and carry) are stored, and a logic network for adding the content of the C register to the content of the A register in accordance with the following sequence. First simultaneously form at time $T_1$ the EXCLUSIVE-OR and the LOGICAL-AND of the contents of the A and C registers in the A and C registers, respectively, and shift the content of the C register to the left one place, either while the LOGICAL-AND is being formed therein or as a separate step at time $T_2$. Then generate additional carry digits in appropriate orders of the C register at time $T_n$ by inserting a binary 1 of a given order $C_i$ if the next lower order $A_{i-1}$ and $C_{i-1}$ are both storing a binary 1, or $A_{i-1}$ is storing a binary 1 and an additional carry 1 is being generated for storage in the order $C_{i-1}$. Finally form the EXCLUSIVE-OR of the contents of the A and C registers in the A register to provide the desired sum at time $T_{n+1}$. That system may be used for subtraction by adding the subtrahend in the two's complement form. That may be readily accomplished by taking the one's complement of the subtrahend and inserting a bit 1 in the lowest order $C_1$ of the C register as the content of the C register is shifted one place to the left. It can also be used for addition of a negative number in the one's complement form by entering into the lowest order $C_1$ of the C register an end-around carry when a positive overflow results and a carry signal is obtained from the highest order digits during the next to last step in the sequence. It can also be adapted for a system using the absolute magnitude of a number in binary form plus a sign by simply computing the sign separately.

The following logic equations define a given order for the system of one embodiment wherein a shift of the contents of the C register to the left one place is accomplished as a separate step at time $T_2$.

$$
\begin{aligned}
{}_1A_i &= A_i'C_i(T_1+T_{n+1}) \\
{}_0A_i &= A_iC_i(T_1+T_{n+1}) \\
{}_1C_i &= C_{i-1}T_2+(C_{i-1}+{}_1C_{i-1})A_{i-1}T_n \\
{}_0C_i &= A_i'T_1+C'_{i-1}T_2
\end{aligned}
$$

The term ${}_1C_{i-1}$ represents the condition at time $T_n$ under which $C_{i-1}$ is being set true (true=1) as a result of a carry being generated for storage in the order $C_{i-1}$. In a preferred embodiment, the LOGICAL-AND of the contents of the A and C registers is effectively shifted one place to the left while it is being stored in the C register at time $T_1$ in accordance with the following general equations.

$$
\begin{aligned}
{}_1C_i &= A_{i-1}C_{i-1}T_1+(C_{i-1}+{}_1C_{i-1})A_{i-1}T_n \\
{}_0C_i &= (A'_{i-1}+C'_{i-1})T_1
\end{aligned}
$$

The general equations for the A register remain the same. By combining the shift operation with the first step, a clock period is saved and the timing pulses $T_n$ and $T_{n+1}$ may be selected to occur one clock period earlier.

A system for subtracting directly is provided by adding additional logic networks to the foregoing to simultaneously form and store borrows in the C register in the first step and to insert borrows in appropriate orders of the C register in the next to last step in accordance with the following logic equations.

$$
\begin{aligned}
{}_1A_i &= A_i'C_i(T_1+T_{n+1})(\mathrm{ADD}+\mathrm{SUB}) \\
{}_0A_i &= A_iC_i(T_1+T_{n+1})(\mathrm{ADD}+\mathrm{SUB}) \\
{}_1C_i &= A_{i-1}C_{i-1}T_1\mathrm{ADD}+A'_{i-1}C_{i-1}T_1\mathrm{SUB} \\
&\quad +(C_{i-1}+{}_1C_{i-1})(A_{i-1}\mathrm{ADD}+A'_{i-1}\mathrm{SUB})T_n \\
{}_0C_i &= (A'_{i-1}+C'_{i-1})T_1\mathrm{ADD}+(A_{i-1}+C'_{i-1})T_1\mathrm{SUB}
\end{aligned}
$$

The novel features which are characteristic of the invention, both with respect to its general organization and method of operation, will be understood from the following description in connection with the accompanying drawings in which.

Figure 1:
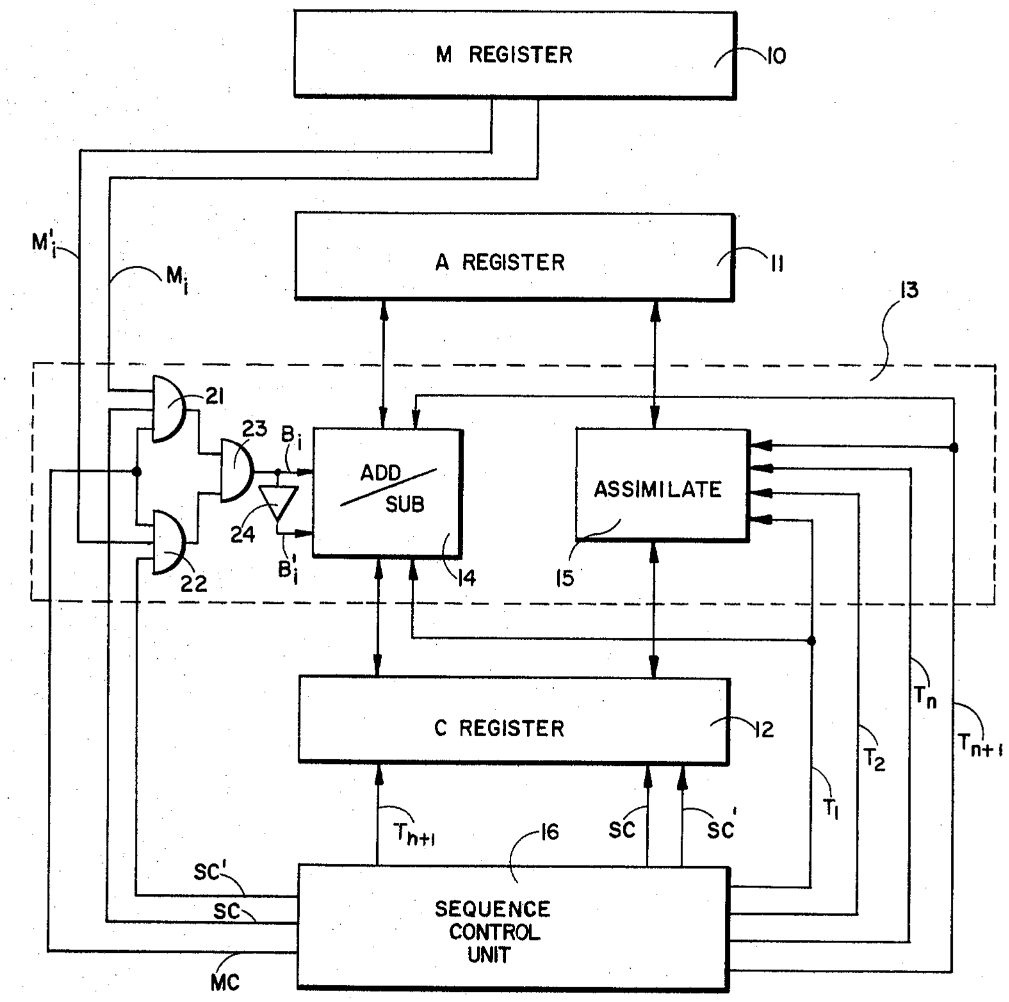
FIG. 1 is a block diagram of an arithmetic unit embodying the present invention.

It is to be expressly understood that the embodiments illustrated in the drawings are for the purpose of illustration and description, not for the purpose of defining the limits of the invention since many modifications will be immediately obvious to those skilled in the art.

FIG. 1 is a general block diagram illustrating the manner in which the present invention may be advantageously employed in a computer having an M register 10 which communicates with a memory section not shown, an A register 11 and a C register 12. The A register functions as an accumulator and holds the augend or minuend before, and the sum or difference after addition or subtraction. It also holds the multiplicand or dividend before, and the product or quotient after multiplication or division. The M register holds the addend or subtrahend during addition or subtraction, and the multiplicand or divisor during multiplication or division. Since the M register communicates with a memory section, it is the register which in the usual computer organization functions as the principal register for arithmetic and data transfer operations. The C register holds the unassimilated carries during the four basic arithmetic operations; it therefore can be functionally considered as being part of the accumulator. By providing the C register to separately store the carries upon each additive operation, such extended operations as multiplication can be performed in the minimum time of one clock period per multiplier digit. The carries may be assimilated with the partial result or pseudo-sum in the A register only at the conclusion of a sequence of additive operations. Since the assimilation in accordance with the present invention takes only a few clock periods, the complete result or sum can be provided in the A register by assimilating the separately stored carries during an instruction access period. For instance, in a synchronous computer at a 1 megacycle clock rate, timing pulses occur every operating at a 1 megacycle clock rate, timing pulses occur every microsecond. If the cycle for a memory access is 6 microseconds, the carries may be assimilated to provide the complete product in the A register while the next instruction to store the product is being read from memory. In that manner speeds of a fully paralleled arithmetic unit are attained without the more expensive logic network otherwise required to simultaneously generate and add carries in a fully paralleled adder.

A logic network 13 provided for addition or subtraction in the unassimilated carry mode, and for assimilation of the carries at the end of a sequence of additive operations, may be conveniently considered as comprising an ADD/SUB network 14 and a separate ASSIMILATE network 15, although in a preferred embodiment a time sharing of logic gates is provided for the two networks under the direction of a sequence control unit 16 which receives programed instructions from memory and interprets them into sequence control signals in the usual manner of a stored program digital computer.

The ADD/SUB network 14 may be defined by general logic equations as follows:

(1) ${}_1A_i=(B_iA_iC_i+B_iA_i'C_i'+B_i'A_iC_i'+B_i'A_i'C_i)T_1$ (2) ${}_0A_i=(B_i'A_i'C_i'+B_i'A_iC_i+B_iA_i'C_i+B_iA_iC_i')T_1$ (3) ${}_1C_i=A_{i-1}C_{i-1}T_1+B_{i-1}(A_{i-1}+C_{i-1})T_1$ (4) ${}_0C_i=B_i'{}_{-1}(A_i'{}_{-1}+C_i'{}_{-1})T_1+A_i'{}_{-1}C_i'{}_{-1}T_1$ (5) $B_i=M_iSCMC+M_i'SC'MC$

Where:

$T_1$ is a timing signal for an additive operation;
$A_i$ is the augend or minuend;
$M_i$ is the addend or subtrahend;
$C_i$ is the unassimilated carry;
SC is an add control signal;
SC′ is a subtract control signal; and
MC is an M register control signal.

The subscript $i$ is an integer specifying a given order, the orders being numbered 1, 2, 3 . . . in the order of increasing binary significance starting at the right of the registers. Other alternative logic networks may, of course, be implemented to provide addition or subtraction in the unassimilated carry mode. However, in order to time share ADD/SUB network gate with ASSIMILATE network gates, the logic network 14 should include the following equations.

(6) ${}_1A_i=B_i'A_i'C_iT_1$ (7) ${}_0A_i=B_i'A_iC_iT_1$

Figure 3:
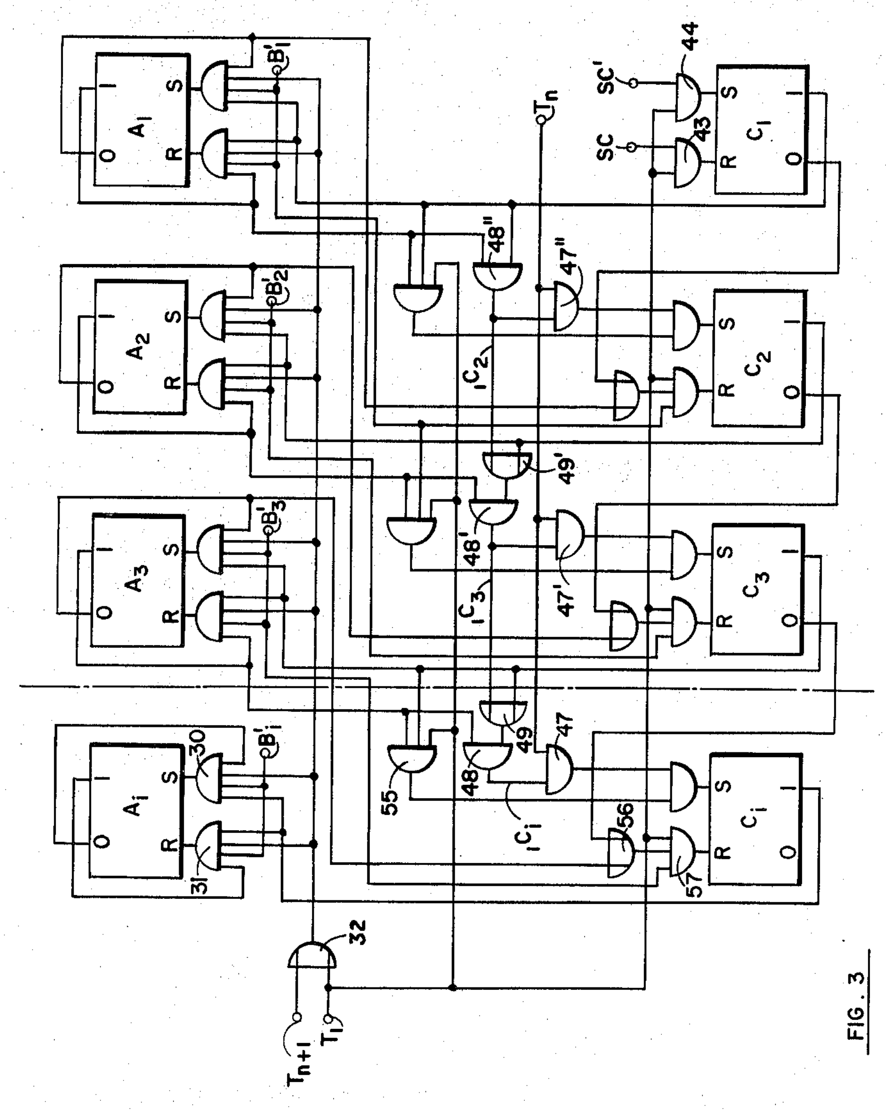
FIG. 3 illustrates in general schematic form a preferred embodiment of the invention.

Similarly, the logic network 14 should include the equations (8) ${}_1C_i=A_{i-1}C_{i-1}T_1$ (9) ${}_0C_i=B_i'{}_{-1}(A_i'{}_{-1}+C_i'{}_{-1})T_1$ to be timed shared with the ASSIMILATE logic 15 in accordance with the preferred embodiment of FIG. 3.

The logic network for generating the terms $B_i$ and $B_i'$ comprises gates 21, 22, 23 and an inverter 24 shown in FIG. 1. Since the add and subtract control signals SC and SC′ are complementary, only one of the AND gates 21 and 22 is enabled to transmit either $M_i$ or $M_i'$, depending upon whether the operation is to add or subtract. If neither gate is enabled because of the absence of a control signal MC, zero is added to the contents of the A register in response to a timing signal $T_1$ transmitted by the control unit 16 for either an add, subtract or assimilate operation.

As noted hereinbefore, the subscript $i$ designates a given order for a register in which the orders are numbered from right to left starting with the least significant order. The highest order in the A and M registers is reserved for the sign. For simplicity it is to be assumed that the C register is provided with the same number of storage positions as the A and M registers, and that the storage positions are comprised of flip-flops which are set to the 1 state through the logic network defined by the corresponding equation preceded by a subscript 1, and reset to the 0 state through the logic network defined by the corresponding equation preceded by a subscript 0.

In operation, an addend in the M register is added to the augend in the A register by the ADD/SUB network 14 and the results stored in the A and C register, all during one clock period since the carries simultaneously generated in the various orders are not assimilated but separately stored in the C register. It should be noted that in accordance with the foregoing Equations 3 and 4, the carry digit from a given order $i-1$ is stored in the next higher $i$, thereby effectively shifting the carry digits to the left as they are generated and stored in the C register.

The unassimilated carry digits are added to the pseudo-sum in the A register during the next additive operation which, for example, may be to subtract the contents of the M register from the contents of the A register. If the next instruction received by the sequence control unit 16 is to subtract, the control signal SC′ enables the AND gate 22 of each order to add the one's complement of the number stored in the M register to the number stored in the A register. As the carries are shifted to the left one position at time $T_1$ or $T_2$, the flip-flop $C_1$ in the least significant position of the C register is set, thereby effectively adding to the result stored in the A and C registers a binary 1 to convert the one's complement being added to the content of the A register to the two's complement. In that manner subtraction by two's complement addition is accomplished. If negative numbers are to be represented by the one's complement instead and it is desired to add a negative number, or it is desired to effect subtraction by one's complement addition, an end-around carry logic network may be provided in the usual manner.

An advantage of the present invention is that all unassimilated carries are positive regardless of whether negative numbers are in the one's or the two's complement form. As each subsequent additive operation is executed, the carries stored in the C register during the preceding operation are added to the content of the A register, thereby effectively assimilating the carries of the preceding operation while storing a new group of unassimilated carries. The unassimilated carries from the last of a sequence of additive operations are assimilated by the operation of the ASSIMILATE network 15 under the control of timing signals $T_1$ to $T_{n+1}$. The complete sum or difference in the A register may then be transferred to memory.

The last timing signal $T_{n+1}$ transmitted by the sequence control section 16 for the assimilation of carries also resets the C register in order that a new sequence of additive operations may be immediately initiated. Each flip-flop is separately reset, either through buffer diodes to their logic reset input terminals or through separate reset input terminals.

Assuming a time sharing of logic gates in accordance with Equations 6 to 9 the carries in the C register are assimilated with the pseudo-sum in the A register by making $B_i$ equal to zero during the assimilate operation. That is accomplished by transmitting an MC′ signal from the sequence control unit 16 to the AND gates 21 and 22 in the same manner as for an add-zero operation. At the same time, a control signal SC is transmitted to an AND gate 26 to enable the flip-flop $C_i$ to be reset as the carries are shifted to the left at time $T_2$ in FIG. 2 or at time $T_1$ in the preferred embodiment of FIG. 3. The control signals are set to the SC MC′ condition in response to a timing signal $T_0$ which is followed by timing signals $T_1$ to $T_{n+1}$ which are transmitted to the ASSIMILATE network 15.

The first timing signal $T_1$ simultaneously forms the EXCLUSIVE-OR of the A and C registers in the A register, and the LOGICAL-AND of the A and C registers in the C register, placing the LOGICAL-AND in the C register one place to the left in the preferred embodiment of FIG. 3 in accordance with the Equations 6 and 7 noted hereinbefore. If the LOGICAL-AND is not shifted while it is being entered into the C register, as in the embodiment of FIG. 2, the shift is accomplished in response to the next timing signal $T_2$ in accordance with the following logic equations.

(10) $${}_1C_i=C_{i-1}T_2$$

(11) $${}_0C_i=A_i'T_1+C'_{i-1}T_2$$

After the LOGICAL-AND has been formed and shifted in the C register, either simultaneously or in a separate step, a carry is set into appropriate orders of the C register at a time $T_n$ by setting true a given order $T_i$ if the next lower orders $A_{i-1}$ and $C_{i-1}$ are both true (i.e., both are storing a binary digit 1) or $A_{i-1}$ is true and $C_{i-1}$ is being set true upon the occurrence of a later timing signal $T_n$ in accordance with the following logic equation.

(12) $${}_1C_i=(C_{i-1}+{}_1C_{i-1})A_{i-1}T_n$$

The exact time of that signal is selected to allow ${}_1C_{i-1}$ signals to be translated through all of the logic gates of successively higher orders.

After a carry has been set into each of the appropriate orders of the C register in response to the timing signal $T_n$, the EXCLUSIVE-OR of the contents of the A and C registers is formed in the A register in response to the next timing signal $T_{n+1}$ to provide in the A register the sum. The same logic network for the EXCLUSIVE-OR function at time $T_1$ is used by forming the logic term $T_1+T_{n+1}$ through an OR gate.

The composite logic of the ASSIMILATE network 15 for a given order if a shift of the content of the C register to the left is performed as a separate step at a time $T_2$ is as follows:

(13) $${}_1A_i=B_i'A_i'C_i(T_1+T_{n+1})$$

(14) $${}_0A_i=B_i'A_iC_i(T_1+T_{n+1})$$

(15) $${}_1C_i=C_{i-1}T_2+(C_{i-1}+{}_1C_{i-1})A_{i-1}T_n$$

(16) $${}_0C_i=B_i'A_i'T_1+C_i'{}_{-1}T_2$$

Figure 2:
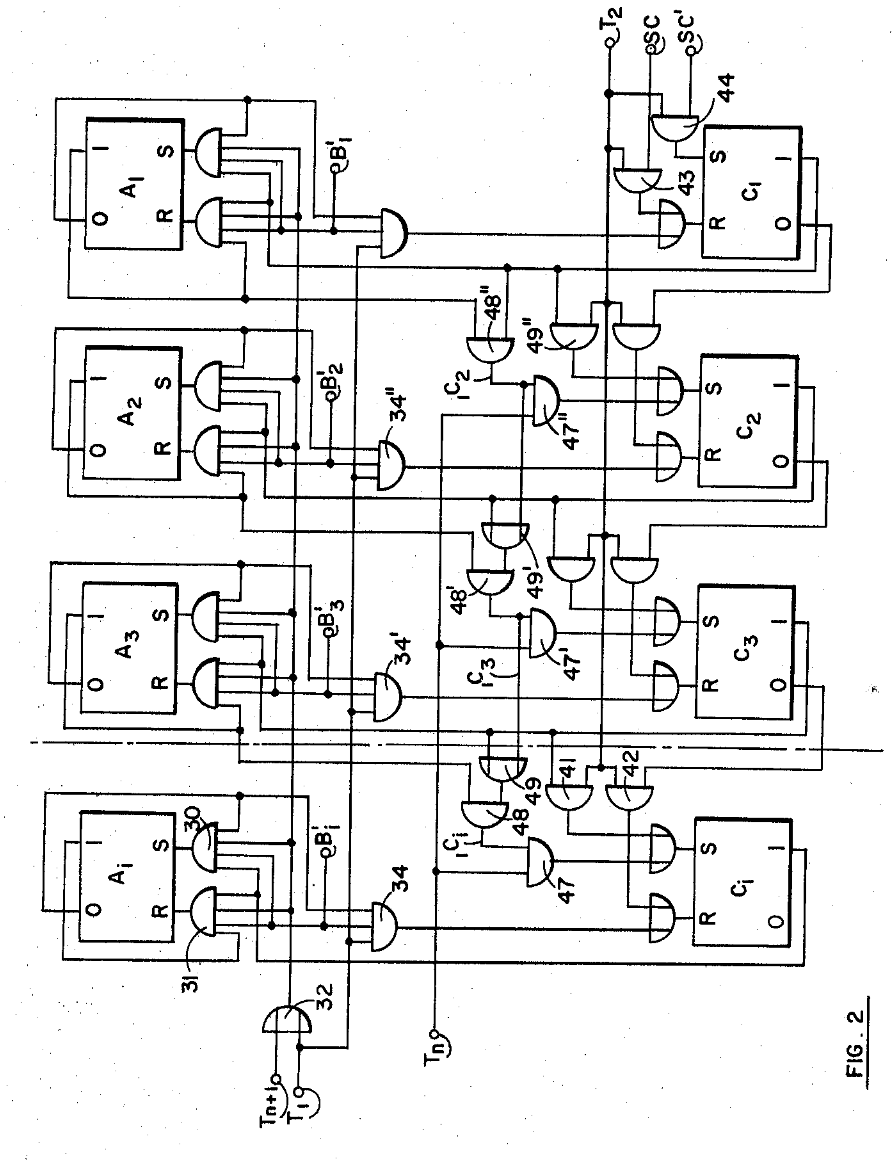
FIG. 2 illustrates in general schematic form one embodiment of the invention.

An implementation of the ASSIMILATE network 15 in accordance with those equations is illustrated in FIG. 2. For simplicity, only four orders have been shown, the most significant order being considered the given order $i$ comprising the flip-flops $A_i$ and $C_i$. Two AND gates 30 and 31 form the EXCLUSIVE-OR of the contents of $A_i$ and $C_i$ in response to either the timing signal $T_1$ or $T_{n+1}$ applied through an OR gate 32. The LOGICAL-AND of $A_i$ and $C_i$ is formed by an AND gate 34 and stored in the flip-flop $C_i$ at time $T_1$.

Only two AND gates are required for the EXCLUSIVE-OR function, the AND gate 30 to set the flip-flop $A_i$ if $C_i$ is equal to 1 and $A_i$ is equal to 0 since the EXCLUSIVE-OR function calls for setting $A_i$ equal to 1 if either $A_i$ or $C_i$ is equal to 1 but not if both $A_i$ and $C_i$ are equal to 1. If $A_i$ is equal to 1 and $C_i$ is equal to 0, the flip-flop $A_i$ should be set, but since it is already set under those circumstances, a logic network to set $A_i$ is not necessary. The AND gate 31 sets $A_i$ equal to 0 if both $A_i$ and $C_i$ are equal to 1. The following table will assist in understanding how only two AND gates are required to provide the EXCLUSIVE-OR function $A_i \oplus B$ in the flip-flop $A_i$.

| $A_i$ | $C_i$ | $A_i \oplus C_i$ | GATE |
|---|---|---|---|
| 0 | 0 | 0 | None |
| 1 | 0 | 1 | None |
| 0 | 1 | 1 | 30 |
| 1 | 1 | 0 | 31 |

The LOGICAL-AND function performed by the AND gate 34 requires that the flip-flop $C_i$ be set equal to 1 only if both $A_i$ and $C_i$ are equal to 1. The following truth table shows that $C_i$ is properly set equal to 1 or 0 under three of the four possible conditions so that it is necessary to provide only one AND gate 34 to set the flip-flop $C_i$ equal to 0 when the flip-flop $A_i$ is equal to 0 and the flip-flop $C_i$ is equal to 1.

| $A_i$ | $C_i$ | $A_iC_i$ | GATE |
|---|---|---|---|
| 0 | 0 | 0 | None |
| 1 | 0 | 0 | None |
| 0 | 1 | 0 | 34 |
| 1 | 1 | 1 | None |

At time $T_2$, as the content of the C register is shifted one place to the left, a binary digit 1 or 0 is shifted into the flip-flop $C_i$ from the next lower order $C_{i-1}$ ($C_3$ in the illustrated embodiment of FIG. 2) through AND gates 41 and 42. At the same time, the least flip-flop $C_1$ of the least significant order is set equal to 0 through an AND gate 43 enabled by the control signal SC for assimilation, and for addition. In order to subtract by adding the two's complement of the subtrahend, the flip-flop $C_1$ is set equal to 1 through an AND gate 44 at time $T_2$.

As noted hereinbefore, a carry is set into appropriate orders of the C register at a time $T_n$ by setting a given order $C_i$ equal to 1 if in the next lower order $A_{i-1}$ and $C_{i-1}$ are both equal to 1, or $A_{i-1}$ is equal to 1 and $C_{i-1}$ is being set equal to 1 by a signal ${}_1C_{i-1}$. Two AND gates 47, 48 and an OR gate 49 provide that logic function in FIGS. 2 and 3 in response to a timing signal $T_n$ the exact time of which is selected to allow sufficient time for carry signals ${}_1C_{i-1}$ to be translated through all of the corresponding logic gates of successively higher orders. In the illustrative embodiments of FIGS. 2 and 3, the corresponding logic gates of each order through which carry signals are translated are the same as the AND gate 48 and the OR gate 49 of the general order $C_i$, such as the AND gate 48' and the OR gate 49' of the order $C_3$ through which the carry signal ${}_1C_2$ is to be transmitted.

The second order $C_2$ requires only AND gates 47'' and 48'' to set the flip-flop $C_2$ equal to 1 if $A_1$ and $C_1$ are both equal to 1. An additional term is not ORed with $C_1$ since lower orders which would generate the alternate condition ${}_1C_1$ are not present.

After carries have been set into appropriate orders of the C register in response to a timing signal $T_n$, the EXCLUSIVE-OR of the contents of the A and C registers is formed in the A register in response to timing signal $T_{n+1}$ through AND-gates 30 and 31 as described hereinbefore, thereby providing the sum in the A register.

The preferred embodiment of FIG. 3 is the same in structure and operation as the embodiment of FIG. 2 except that the shift of the C register is accomplished, in accordance with the Equations 8 and 9 noted hereinbefore, as the LOGICAL-AND is formed therein. Accordingly, all of the gates which perform the same functions in the same way are identified by the same reference numerals in FIG. 3 as in FIG. 2. Equation 8 is implemented by AND gate 55 for the general order comprising $A_i$ and $C_i$ in FIG. 3. Similarly, Equation 9 is implemented by OR gate 56 and AND gate 57. The only other modification is that in the embodiment of FIG. 3, the AND gates 43 and 44 are activated by a timing signal $T_1$ instead of $T_2$, but for the same end result, namely setting $C_1$ equal 0 as the LOGICAL-AND is being shifted to the left during addition or assimilation of carries, and equal to 1 during subtraction.

Regardless of whether the shift in the C register is accomplished in a separate step as in FIG. 2 or while forming the LOGICAL-AND therein as in FIG. 3, the entire operation of assimilating the carries by adding the content of the C register to the contact of the A register in accordance with the present invention may be accomplished within 5 microseconds if the high speed NAND gates of FIG. 5 are used. Accordingly, the assimilation can usually occur during the 6 microseconds of a memory cycle for the next instruction in a computer with a memory section having an access time of 2 microseconds. For example, if the next instruction is to store the sum, the operation code is immediately detected as it is read from memory to initiate the operation of assimilating the carries in response to timing signals $T_2$ (FIG. 2 only), $T_n$ and $T_{n+1}$ applied to the ASSIMILATE network 15 (FIG. 1) to form the sum in the A register in time for the store operation to be properly executed.

Although the illustrative embodiments of FIGS. 1 and 2 have been disclosed in general terms such that direct implementation may be made with diode gates, it should be understood that other equivalent gates may be employed to advantage, such as NAND or NOR gates. For instance, the diode gate implementation of the operation which occurs at $T_n$ as illustrated in FIGS. 2 and 3 requires two cascaded gates per order, the AND gate 48 in cascade with the OR gate 49. However, by using NAND or NOR gates, the number of cascaded gates per order may be reduced to one per order by taking advantage of that characteristic of NAND and NOR gates which provides a logic function by directly connecting their output terminals. For instance, a first double-input NAND gate having at its input terminals signals $C'_{i-1}$ and ${}_1C'_{i-1}$ provides at its output terminal the logic function $C_{i-1}+{}_1C_{i-1}$. If a second single-input NAND gate having at its input terminal a signal $A'_i$ is then provided with its output terminal directly connected to the output terminal of the first NAND gate, the logic function $(C_i+{}_1C_{i-1})A_{i-1}$ is provided. In that manner the logic function $(C_{i-1}+{}_1C_{i-1})A_{i-1}={}_1C_i$ is effectively achieved with only one level of gating, instead of two, thereby minimizing the transmission time of that signal which is required for the corresponding logic function at the next level. A suitable NAND gate circuit is described at page 396 of Transistor Circuit Design edited by J. A. Walston et al., and published in 1963 by McGraw-Hill Book Co. Due to the inherent inverting function of each NAND gate, the complement of the desired function is similarly achieved in the next higher order by providing ${}_1C_i$ and $A_i$ as input signals to a first NAND gate and $C_i$ and $A_i$ as input signals to the input terminals of a second NAND gate having its output terminal connected directly to the output terminal of the first NAND gate to provide ${}_1C'_{i+1}$. That signal ${}_1C'_{i+1}$ may then be employed to generate ${}_1C_{i+2}$ in the same manner as ${}_1C_i$.

The operation of the invention is best illustrated by an example of a sequence of additive operations to solve the equation 14+7+46=67. For simplicity, it is assumed that the preferred embodiment of FIG. 3 is to be employed which shifts the LOGICAL-AND of the A and C registers as it is being formed in the C register one place to the left during assimilation of the carries.

The sequence is initiated by a suitable instruction such as an instruction to "clear and add" which clears the C registers to zero and places the binary number 14 in the A register. The next instruction adds 7 to the content of the A register through the ADD/SUB network 14 in accordance with the general logic Equations 1 to 4 noted hereinbefore. The pseudo-sum formed in the A register and the unassimilated carries stored in the C register equal the sum of 21. The following is an example of the additive operation 14+7=21.

| | | | | | | | | |
|---|---|---|---|---|---|---|---|---|
| A | 0 | 0 | 0 | 0 | 1 | 1 | 1 | 0 |
| C | 0 | 0 | 0 | 0 | 0 | 0 | 0 | 0 |
| M | 0 | 0 | 0 | 0 | 0 | 1 | 1 | 1 |
| A | 0 | 0 | 0 | 0 | 1 | 0 | 0 | 1 |
| C | 0 | 0 | 0 | 0 | 1 | 1 | 0 | 0 ↙ |

The arrow in the least significant position of the C register indicates a zero inserted as the LOGICAL-AND is being formed and shifted one place to the left in the C register.

The next additive operation is similarly performed in response to another add instruction thereby assimilating the carries stored in the C register during the preceding additive operation and storing therein a new group of unassimilated carries in accordance with Equations 3 and 4. The following is an example of that additive operation 21+46=67.

| | | | | | | | | |
|---|---|---|---|---|---|---|---|---|
| A | 0 | 0 | 0 | 0 | 1 | 0 | 0 | 1 |
| C | 0 | 0 | 0 | 0 | 1 | 1 | 0 | 0 |
| M | 0 | 0 | 1 | 0 | 1 | 1 | 1 | 0 |
| A | 0 | 0 | 1 | 0 | 1 | 0 | 1 | 1 |
| C | 0 | 0 | 0 | 1 | 1 | 0 | 0 | 0 ↙ |
| SUM | 0 | 1 | 0 | 0 | 0 | 0 | 1 | 1 |

The sum of 67 is stored partly in the A register and partly in the C register. The correct sum of 67 could be obtained by assimilating the carries with the pseudo-sum in the A register, but to accomplish that while adding would require either time to allow carries to be propagated from order to order in sequence or expensive parallel logic network to sumultaneously generate all carries. For instance, the assimilation of a pseudo-sum 1 and a carry 1 in the fourth order would produce the sum 0 and a carry to be added in the fifth order. The addition of the carry propagated to the fifth order and the unassimilated carry in the fifth order would produce the sum 0 and a carry to be added in the sixth order. Finally, the addition of the carry propagated to the sixth order and the pseudo-sum 1 in the sixth order of the A register would produce the sum 0 with a carry propagated to the next more significant order where it produces a binary 1 in the next more significant order of the A register upon being added. Thus considerable time is required to propagate carries. That time is avoided by not assimilating the carries during the additive operation but separately storing them in the C register. The sequence of additive operations may then be extended without undue delays for each additive operation which assimilates the carries from the preceding operation directly and separately stores carries generated thereby in the C register, all in accordance with Equations 1 to 4.

At the conclusion of the sequence of additive operations, the carries are assimilated, such as in response to an instruction to store the sum in a memory location. The assimilation is accomplished by the ASSIMILATE network 15 in accordance with the present invention. The instruction which initiates the assimilating operation first provides an add-zero operation at time $T_1$ by generating control signals MC′ and SC. The result of the add-zero operation is the simultaneous formation of the EXCLUSIVE-OR in the A register and the LOGICAL-AND in the C register of the contents of the A and C registers in accordance with Equations 6 to 9. The following example illustrates the add-zero operation.

| | | | | | | | | |
|---|---|---|---|---|---|---|---|---|
| A | 0 | 0 | 1 | 0 | 1 | 0 | 1 | 1 |
| C | 0 | 0 | 0 | 1 | 1 | 0 | 0 | 0 |
| M | 0 | 0 | 0 | 0 | 0 | 0 | 0 | 0 |
| A | 0 | 0 | 1 | 1 | 0 | 0 | 1 | 1 |
| C | 0 | 0 | 0 | 1 | 0 | 0 | 0 | 0 |

It should be noted that while the LOGICAL-AND of the contents of the A and C register is being formed in the C register, it is shifted one place to the left and a binary 0 is inserted in the least significant position $C_1$ in response to the presence of an SC signal at time $T_1$.

The next operation in the process of assimilating the carries is to insert into appropriate orders of the C register a carry digit if the next lower orders of the A and C registers are both storing a binary 1 or if the next lower order of the A register is storing a binary 1 and a carry digit is being set into the next lower order of the C register. The following example illustrates that operation in accordance with Equation 12 noted hereinbefore.

| | | | | | | | | |
|---|---|---|---|---|---|---|---|---|
| A | 0 | 0 | 1 | 1 | 0 | 0 | 1 | 1 |
| C | 0 | 0 | 0 | 1 | 0 | 0 | 0 | 0 |
| C | 0 | 1 | 1 | 1 | 0 | 0 | 0 | 0 |

In the example, an arrow indicates the insertion of a carry digit in the two appropriate positions. The carry digit entered in the least significant of those two positions results from the presence of a binary 1 in the next least significant positions of the A and C registers. The insertion of a carry digit in the more significant position is a result of the presence of a binary 1 in the next least significant position of the A register and the insertion of a binary 1 in the next least significant position of the C register.

The final operation in the process of assimilating the carries is to form in the A register the EXCLUSIVE-OR of the contents of the A and C registers in accordance with the Equations 13 and 14 noted hereinbefore. The following is an example of that last operation which occures in response to a timing signal $T_{n+1}$ transmitted by the sequence control unit 16 only during assimilation of the carries.

| | | | | | | | | |
|---|---|---|---|---|---|---|---|---|
| A | 0 | 0 | 1 | 1 | 0 | 0 | 1 | 1 |
| C | 0 | 1 | 1 | 1 | 0 | 0 | 0 | 0 |
| A | 0 | 1 | 0 | 0 | 0 | 0 | 1 | 1 |

It should be noted that when executing the final operation in response to a timing signal $T_{n+1}$, the C register is reset so that immediately after the content of the A register is stored in memory, a new sequence of additive operations may be introduced by the next instruction; otherwise the last assimilated carries stored therein would be added in accordance with Equations 1 to 4.

Since the unassimilated carries stored separately in the C register are always positive, a sequence of instructions may include instructions to both add and subtract without separate assimilation of the carries until the final result is reached and it is to be stored in memory.

If subtraction is to be accomplished by adding the subtrahend in the two's complement form, an instruction to subtract generates an SC′ signal in the sequence control unit to transmit the one's complement of the subtrahend to the logic network 13 and to a cause a binary 1 to be entered into the least significant position of the C register while the unassimilated carries formed therein are shifted one place to the left. Similarly, if subtraction is to be accomplished by adding the subtrahend in the one's complement form, the SC′ control signal generated by an instruction to subtract enables the one's complement of the subtrahend to be transmitted to the logic network 13 and an end-around carry to be entered into the least significant position of the C register as the carries formed therein are shifted one place to the left.

Figure 4:
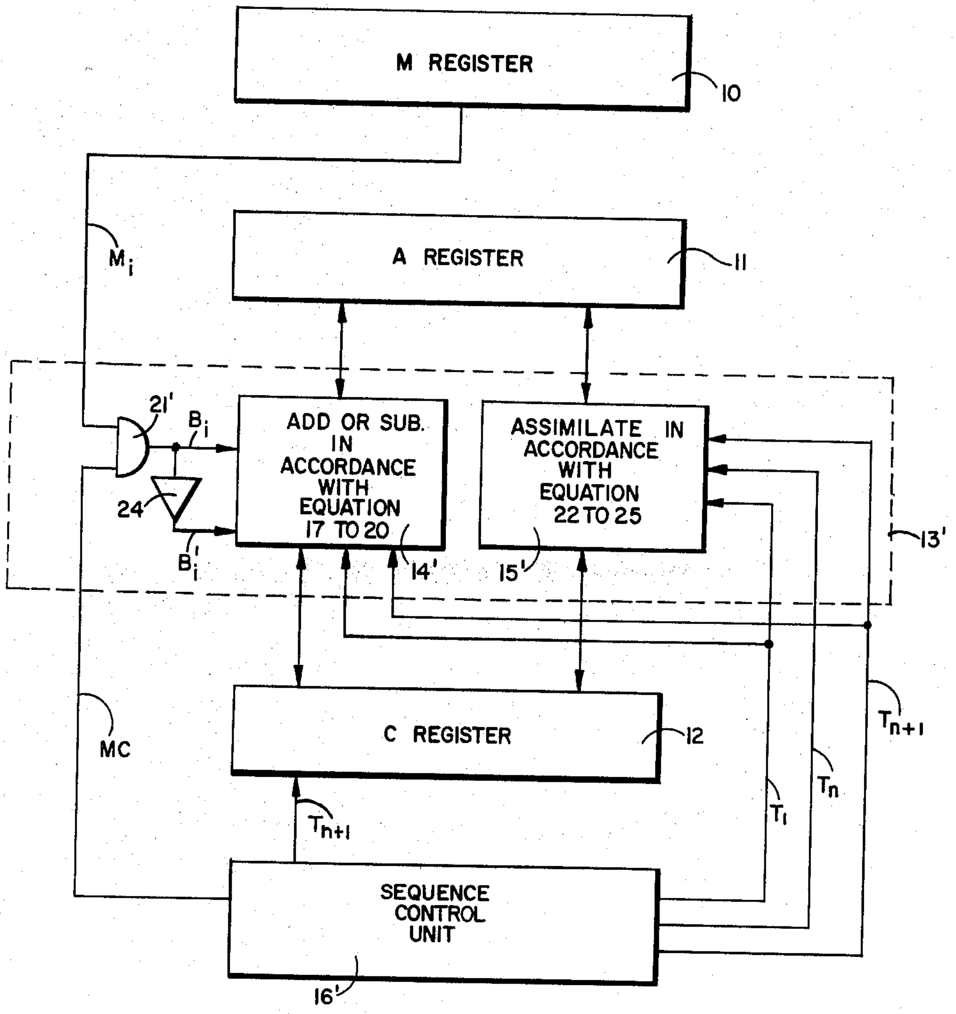
FIG. 4 illustrates in block diagram form another embodiment.

In order to subtract directly, instead of by means of complementing the subtrahend, additional structure may be provided in the ADD/SUB network 14 of FIG. 1 for subtraction to provide a network 14′ in FIG. 4 in accordance with the following equations:

$$(17)\quad {}_1A_i=(B_iA_iC_i+B_iA_i'C_i'+B_i'A_iC_i'+B_i'A_i'C_i)T_1\ (\mathrm{ADD}+\mathrm{SUB})$$

$$(18)\quad {}_0A_i=(B_i'A_i'C_i'+B_i'A_iC_i+B_iA_i'C_i+B_iA_iC_i')T_1\ (\mathrm{ADD}+\mathrm{SUB})$$

$$(19)\quad {}_1C_i=A_{i-1}C_{i-1}T_1\ \mathrm{ADD}+B_{i-1}(A_{i-1}+C_{i-1})T_1\ \mathrm{ADD}+A_{i}'{}_{-1}C_{i-1}T_1\ \mathrm{SUB}+B_{i-1}(A_i'{}_{-1}+C_{i-1})T_1\ \mathrm{SUB}$$

$$(20)\quad {}_0C_i=B_i'{}_{-1}(A_i'{}_{-1}+C_i'{}_{-1})T_1\ \mathrm{ADD}+A_i'{}_{-1}C_i'{}_{-1}T_1\ \mathrm{ADD}+A_{i-1}C_i'{}_{-1}T_1\ \mathrm{SUB}+B_i'{}_{-1}(A_{i-1}+C_i'{}_{-1})T_1\ \mathrm{SUB}$$

$$(21)\quad B_i=M_iMC$$

The ASSIMILATE logic 15 is similarly expanded to provide a network 15′ in FIG. 4, again time sharing logic gates wherever possible, in accordance with the following equations:

$$(22)\quad {}_1A_i=B_i'A_i'C_i(T_1+T_{n+1})\ (\mathrm{ADD}+\mathrm{SUB})$$

$$(23)\quad {}_0A_i=B_i'A_iC_i(T_1+T_{n+1})\ (\mathrm{ADD}+\mathrm{SUB})$$

$$(24)\quad {}_1C_i=A_{i-1}C_{i-1}T_1\ \mathrm{ADD}+A_i'{}_{-1}C_{i-1}T_1\ \mathrm{SUB}+(C_{i-1}+{}_1C_{i-1})(A_{i-1}\ \mathrm{ADD}+A_i'{}_{-1}\ \mathrm{SUB})T_n$$

$$(25)\quad {}_0C_i=B_i'{}_{-1}(A_i'{}_{-1}+C_i'{}_{-1})T_1\ \mathrm{ADD}+B_{i-1}(A_{i-1}+C_i'{}_{-1})T_1\ \mathrm{SUB}$$

It should be noted that the resulting network 13′ is similar to the logic network 13 described hereinbefore with reference to FIGS. 1 and 3 in that the separately stored carries and borrows are shifted one place to the left as they are formed therein. The additional logic network required for the C register results from the rules for generating borrows for subtraction which are different from the rules for generating carries for addition. However, the general organization and operation of such an ASSIMILATE logic network 15′ of FIG. 4 is the same as the ASSIMILATE logic network 15 of FIG. 1.

The following simple example of subtracting 3 from 6 illustrates the subtractive operation of the system of FIG. 4 having direct subtraction in accordance with the foregoing equations. In the first step the EXCLUSIVE-OR of the operands is formed in the A register while the borrows are being formed and shifted one place to the left in the C register thus:

| | | | | | |
|---|---|---|---|---|---|
| A | 0 | 0 | 1 | 1 | 0 |
| B | 0 | 0 | 0 | 1 | 1 |
| C | 0 | 0 | 0 | 0 | 0 |
| A | 0 | 0 | 1 | 0 | 1 |
| C | 0 | 0 | 0 | 1 | 0 |

This simple example assumes that the subtractive operation is the first of a sequence or the only subtractive operation to be performed before assimilating borrows. However, it may be readily appreciated that if the preceding operation is also a subtractive one, the A and C registers would be storing the difference, the pseudo-difference in the A register and the unassimilated borrows in the C register. Those unassimilated borrows would be assimilated during the subsequent subtractive operation and new borrows separately stored in the C register.

The separate logic network 13′ of FIG. 4 for subtraction and assimilation of separately stored borrows may also be implemented with a distinct shifting step in response to a timing signal $T_2$ in a manner similar to the system described with reference to FIG. 2.

In the next step, at time $T_n$ if another subtractive operation is not to be performed and the separately stored borrows are to be assimilated, a borrow is inserted in a given order $C_i$ if the next lower order $C_{i-1}$ is storing a borrow, or a borrow is being concurrently inserted therein, and the next lower order $A_{i-1}$ of the A register is not storing a binary 1 thus:

| | | | | | |
|---|---|---|---|---|---|
| A | 0 | 0 | 1 | 0 | 1 |
| C | 0 | 0 | 0 | 1 | 0 |
| C | 0 | 0 | 1 | 1 | 0 |

In the last step, at time $T_{n+1}$, the EXCLUSIVE-OR of the contents of the A and C registers is formed in the A register to yield the difference with assimilated borrows.

A sequence of subtractive steps can be executed, each subtraction being in response to a timing signal $T_1$. The remaining timing signals $T_n$ and $T_{n+1}$ are not applied to the ASSIMILATE network until the last subtraction has been executed at a time $T_1$ under control of the sequence control unit 16′.

In summary, the rules for performing a sequence of additive operations in the unassimilated-carry mode where each operation is the addition of a binary number, or the subtraction of a binary number by the addition of its complement, to the pseudo-sum and its separately stored carries of an immediately preceding additive operation, are as follows. First, store in a first register the pseudo-sum of corresponding orders of two binary numbers and simultaneously store in a second register the resulting carries. If the additive operation is the first or only additive operation to be performed, the first step consists of simply storing the EXCLUSIVE-OR of two numbers being added in the first register and their LOGICAL-AND in the second register. Second, the content of the second register is shifted one place in the direction of higher orders either separately or while carries are being stored therein. The rules for each successive additive operation are the same until after the final additive operation. Third, to combine the separately stored carries of the final additive operation with its pseudo-sum, insert a carry, or binary 1 in a given order of the second register if the next lower order of the second register is storing a binary 1, or a binary 1 is being concurrently stored therein, and the corresponding lower order of the first register is storing a binary 1. Finally, the EXCLUSIVE-OR of the contents of the first and second registers is formed in the first register to provide the sum with assimilated carries.

The rules for performing a sequence of subtractive operations in the unassimilated-borrow mode, where each operation is the direct subtraction of a binary number from the pseudo-difference and its separately stored borrows of an immediately preceding additive operation, are as follows. First, store in a first register the pseudo-difference of corresponding orders of two binary numbers to be subtracted one from the other, and simultaneously store in a second register the resulting borrows. If the subtractive operation is the first or only subtractive operation of a sequence of operations the first step consists of simply storing the EXCLUSIVE-OR of the two numbers in the first register and the borrows in the second register. Second, shift the content of the second register one place in the direction of higher orders either separately or while carries are being stored therein. The rules for each successive subtractive operation are the same until the final subtractive operation. Third, after the last subtractive operation insert a borrow, or binary 1, in a given order of the second register if the next lower order of the second register is storing a borrow, or a borrow is being concurrently stored therein, and the corresponding lower of the first register is storing a binary 1. Finally form the EXCLUSIVE-OR of the contents of the first and second registers in the first register to provide the difference with assimilated borrows.

While there have been illustrated and described the best embodiments of the invention known, it will be apparent to those skilled in the art that changes may be made without departing from the true spirit of the invention, and that in some applications certain features may be advantageously employed without a corresponding use of other features. Accordingly, the appended claims are intended to cover and embrace those changes and features.

What is claimed is:

1. In a system for adding binary numbers and separately storing the carries, the combination comprising first and second registers, first means for storing in said first register the EXCLUSIVE-OR of corresponding orders of two binary numbers being added and simultaneously storing in said second register the LOGICAL-AND of said corresponding orders, second means for shifting said LOGICAL-AND stored in said second register one place in the direction of higher order positions of said first and second registers, third means for inserting a binary 1 in a given order of said second register if the next corresponding lower orders of said first and second registers are both storing a binary 1, or the next lower order of said first register is storing a binary 1 and a binary 1 is being concurrently stored in the next lower order, and finally storing in one of said registers the EXCLUSIVE-OR of the contents of said first and second registers to provide the sum therein.

2. In a system for performing a sequence of additive operations, each additive operation being the addition of a binary number to the pseudo-sum of a preceding additive operation and the separately stored carries of that preceding additive operation, and again separately storing the carries, the combination comprising first and second registers, means for first storing in said first register the pseudo-sum of corresponding orders of a binary number being added in a given additive operation and the pseudo-sum and carries of a preceding additive operation, and storing in said second register the carries of said given additive operation, means for shifting said carries in said second register one place in the direction of higher order positions of said second register, means for then inserting after the last additive operation of said sequence a binary 1 in a given order of said second register if the next corresponding lower orders of said first and second registers are both storing a binary 1, or the next lower order of said first register is storing a binary 1 and a binary 1 is being concurrently inserted in the next lower order of said second register, and means for finally forming in one of said registers, the EXCLUSIVE-OR of the contents of said first and second registers to provide the sum therein.

3. In a system for adding binary numbers and for subtracting by adding the complement of the subtrahend, and separately storing the carries, the combination comprising first and second registers, means for first storing in a first register the EXCLUSIVE-OR of corresponding orders of two binary numbers being added or subtracted, and simultaneously storing in a second register the LOGICAL-AND of said corresponding orders, shifting the LOGICAL-AND in said second register one place in the direction of higher order positions in said second register, means for then inserting a binary 1 in a given order of said second register if the next corresponding lower orders of said first and second registers are both storing a binary 1, or the next lower order of said first register is storing a binary 1 and a binary 1 is being inserted in the next lower order of said second register, and means for finally storing in one of said registers the LOGICAL-AND of the corresponding orders of said first and second registers to provide the sum therein.

4. In a system for performing a sequence of additive operations each additive operation being the addition of a binary number, or the subtraction of a binary subtrahend by the addition of its complement, to the pseudo-sum of the immediately preceding additive operation stored in a first register and to carries generated by the immediately preceding operation separately stored in a second register, the combination comprising means for first storing in said first register the pseudo-sum digits of corresponding orders of a binary number being added in a given additive operation and the pseudo-sums and carries of a preceding additive operation, and storing in said second register the carries of said given additive operation, means for shifting said carries in said second register one place in the direction of higher order positions thereof, means for assimilating said separately stored carries with corresponding pseudo-sum digits in said first register after the last additive operation of said sequence by inserting a binary 1 in a given order of said second register if the next corresponding lower orders of said first and second registers are both storing a binary 1, or the next lower order of said first register is storing a binary 1 and a binary 1 is being inserted in the next lower order of said second register, and means for finally forming the EXCLUSIVE-OR of the contents of said first and second registers in one of said registers to provide the sum therein.

5. In a system for directly substracting a binary number and separately storing the borrows, the combination comprising first and second registers, first means for storing in said first register the EXCLUSIVE-OR of corresponding orders of two binary numbers being subtracted, one from the other, and simultaneously storing in a second register the borrows of said corresponding orders, means for shifting said borrows in said second register one place in the direction of higher order positions of said second register, means for then inserting a binary 1 in a given order of said second register if the next corresponding order of the second register is storing a borrow, or a borrow is being concurrently inserted therein, and the next corresponding lower order of the first register is storing a binary 0, and means for finally storing in said first register the EXCLUSIVE-OR of the corresponding orders of said first and second registers to provide the difference.

6. In a system for adding binary numbers and separately storing the carries, the combination comprising first and second registers, first means for storing in said first register the pseudo-sum of corresponding orders of two binary numbers being added and for simultaneously storing in said second register the carries of said corresponding orders, second means for shifting said carries in said second register one place in the direction of higher order positions of said second register, third means for inserting a binary 1 in a given order $C_i$ of said second register if the next corresponding lower orders $C_{i-1}$ and $A_{i-1}$ of said first and second registers respectively are both storing a binary 1, or the next lower order $A_{i-1}$ of said first register is storing a binary 1 and a binary 1 is being concurrently inserted in the next lower order $C_{i-1}$ in accordance with the logic equation ${}_1C_i=(C_{i-1}+{}_1C_{i-1})A_{i-1}$, and fourth means for storing in said first register the EXCLUSIVE-OR of corresponding orders of said first and second registers to provide the sum with assimilated carries.

7. In a system for subtracting directly and separately storing the borrows, the combination comprising a first and second register, first means for directly subtracting one number from another and storing in said first register the pseudo-difference of corresponding orders of said two binary numbers, and for simultaneously storing in said second register borrows generated thereby, second means for shifting the borrows in said second register one place in the direction of higher order positions of said second register, third means for then inserting a binary 1 in a given order $C_i$ of said second register if the next corresponding lower order $C_{i-1}$ of said second register is storing a borrow, or a borrow is being concurrently inserted therein, and the next lower order $A_{i-1}$ of said first register is storing a binary 0, in accordance with the equation ${}_1C_i=(C_{i-1}+{}_1C_{i-1})A_{i-1}$, and fourth means for finally storing in said first register the EXCLUSIVE-OR of corresponding orders of said first and second registers.

8. In a system for assimilating a pseudo-sum and separately stored carries, the combination comprising a first register A for storing the pseudo-sum of corresponding orders of two binary numbers added and a second register C for storing the carries of said corresponding orders of said said two binary numbers added, said carries being shifted in said second register one place in the direction of higher order positions of said first and second registers, means for inserting a binary 1 in a given order $C_i$ of said second register if the next corresponding lower orders $C_{i-1}$ and $A_{i-1}$ of said first and second registers respectively are both storing a binary 1, or the next lower order $A_{i-1}$ of said first register in storing a binary 1 and a binary 1 is being concurrently inserted in the next lower order $C_{i-1}$ in accordance with the logic equation ${}_1C_i=(C_{i-1}+{}_1C_{i-1})A_{i-1}$, and means for then storing in said first register the EXCLUSIVE-OR of the contents of said first and second registers to provide thereby the sum in accordance with the logic equations ${}_1A_i=A_i'C_i$ and ${}_0A_i=A_iC_i$ for a given order.

9. In a system for performing a sequence of additive operations, each additive operation being the addition of a binary number N to the pseudo-sum of a preceding additive operation, or the subtraction of a binary number by the addition of its complement N′, and the separately stored carries of that preceding additive operation, and again separately storing the carries, the combination comprising a first register A and a second register C, means for storing in said first register A the pseudo-sum digits of corresponding order of a binary number N being added in a given additive operation and the pseudo-sum and carries of a preceding additive operation, and storing in said second register C the carries of said given additive operation in accordance with the following logic equations for a given order:

$$_1A_i=(B_iA_iC_i+B_iA_i'C_i'+B_i'A_iC_i'+B_i'A_i'C_i)$$
$$_0A_i=(B_i'A_i'C_i'+B_i'A_iC_i+B_iA_i'C_i+B_iA_iC_i')$$
$$_1C_i=A_{i-1}C_{i-1}+B_{i-1}(A_{i-1}+C_{i-1})$$
$$_0C_i=B'_{i-1}(A'_{i-1}+C'_{i-1})+A'_{i-1}C'_{i-1}$$

where $B_i$ is the number N being added or the complement N' of a number N being subtracted, means for inserting a binary 1 in a given order $C_i$ of said second register if the next corresponding lower orders $A_{i-1}$ and $C_{i-1}$ of said first and second registers respectively are both storing a binary 1 or the next lower order of said first register is storing a binary 1 and a binary 1 is being stored in the next lower order in accordance with the logic equation $$_1C_i=(C_{i-1}+{}_1C_{i-1})A_i$$

for said given order, and means for finally storing in said first register A the final sum of said sequence of additive operations in accordance with the logic equations $_1A_i=B_i'A_i'C_i$ and $_0A_i=B_i'A_iC_i$ for a given order.

10. In a system for assimilating a pseudo-difference and separately stored borrows, the combination comprising a first register A for storing the pseudo-difference of corresponding orders of two binary numbers subtracted one directly from the other and a second register C for storing the borrows of said corresponding orders of said two binary numbers added, said borrows being shifted in said second register one place in the direction of higher order positions of said first and second registers, means for inserting a binary 1 in a given order $C_i$ of said second register if the next corresponding order $C_{i-1}$ of the second register is storing a borrow, or a borrow is being concurrently inserted therein, and the next corresponding lower order $A_{i-1}$ of the first register is storing a binary 0, in accordance with the logic equation $_1C_i=(C_{i-1}+{}_1C_{i-1})A'_{i-1}$, and means for then storing in said first register the EXCLUSIVE-OR of the corresponding orders of said first and second registers to provide the difference in accordance with the logic equations $$_1A_i=A_i'C_i$$

and $_0A_i=A_iC_i$ for a given order.

11. In a system for performing a sequence of subtractive operations, each substractive operation consisting of subtracting directly a binary number from the pseudo-difference and separately stored borrows resulting from an immediately preceding subtractive operation, and again separately storing the borrows, the combination comprising a first register A and a second register C, means for storing in said first register A the pseudo-difference of corresponding orders of a number to be subtracted from a pseudo-difference and its separately stored borrows resulting from an immediately preceding subtractive operation and concurrently storing in said second register C the borrows generated thereby, in accordance with the following logic equations for a given order:

$$_1A_i=(B_iA_iC_i+B_iA_i'C_i'+B_i'A_iC_i'+B_i'A_i'C_i)$$
$$_0A_i=(B_i'A_i'C_i'+B_i'A_iC_i+B_iA_i'C_i+B_iA_iC_i')$$
$$_1C_i=A'_{i-1}C_{i-1}+B_{i-1}(A_{i-1}+C_{i-1})$$
$$_0C_i=A_{i-1}C'_{i-1}+B_{i-1}(A_{i-1}+C'_{i-1})$$

where $A_i$ is the minuend, and $B_i$ is the subtrahend, means for inserting a binary 1 in a given order $C_i$ of said second register if the next lower order $C_{i-1}$ of said second register is storing a borrow, or a borrow is being concurrently inserted therein, and the next lower order $A_{i-1}$ of the first register is storing a binary 0 in accordance with the logic equation $$_1C_i=(C_{i-1}+{}_1C_{i-1})A_i'$$

for said given order, and means for storing in said first register the EXCLUSIVE-OR of corresponding orders of said first and second registers to provide the final difference of said sequence of subtractive steps in accordance with the logic equations $_1A_i=B_i'A_i'C_i$ and $_0A_i=B_i'A_iC_i$ for a given order.

12. In a system for adding binary numbers the combination comprising:

a first register A for storing a first number to be added, a second register C for storing a second number to be added, first means for storing in said first register A the EXCLUSIVE-OR of corresponding orders of said two binary numbers being added and for simultaneously storing in said second register C the LOGICAL-AND of said corresponding orders in accordance with the logic equations: $A_i=A_i'C_i$; $_0A_i=A_iC_i$; and $_0C_i=A_i'$, second means for next shifting said LOGICAL-AND in said second register one place in the direction of higher order positions in accordance with the equations $_1C_i=C_{i-1}$ and $_0C_i=C'_{i-1}$, third means for then inserting a binary 1 in a given order $C_i$ of said second register C if the next corresponding lower orders $A_{i-1}$ and $C_{i-1}$ of said first and second registers are both storing a binary 1, or the next lower order of said first register $A_{i-1}$ is storing a binary 1 and a binary 1 is concurrently being inserted in the next lower order $C_{i-1}$ of said second register in accordance with the logic equation $$C_i=(C_{i-1}+{}_1C_{i-1})A_{i-1}$$

and fourth means for finally storing in said first register the EXCLUSIVE-OR of corresponding orders of said first and second registers to provide the sum with assimilated carries in accordance with the logic equations $_1A_i=A_i'C_i$ and $_0A_i=A_iC_i$ for a given order.

13. In a system for subtracting directly one binary number from the other the combination comprising a first register A for storing a first number, a second register C for storing a second number to be subtracted from said first number, first means for storing in said first register A the EXCLUSIVE-OR of corresponding orders of said two binary numbers and for simultaneously storing in said second register C the borrows generated by subtracting said second number from said first number in accordance with the following logic equations: $_1A_i=A_i'C_i$; $_0A_i=A_iC_i$; and $_0C_i=A_i$ for a given order of said first and second registers, second means for next shifting the borrows in said second register one place in the direction of higher order positions of said second register in accordance with the equations $_1C_i=C_{i-1}$ and $_0C_i=C'_{i-1}$, third means for then inserting a binary 1 in a given order $C_i$ of said second register if the next corresponding lower order $C_{i-1}$ of said second register is storing a borrow, or a borrow is being concurrently inserted therein, and the next lower order of said first register is storing a binary 0 in accordance with the logic equation $C_i=(C_{i-1}+{}_1C_{i-1})A'_{i-1})$ for a given order, and fourth means for finally storing in said first register the EXCLUSIVE-OR of corresponding orders of said first and second registers in accordance with the logic equations $_1A_i=A_i'C_i$ and $_0A_i=A_iC_i$ for a given order.

14. A binary adder comprising
first and second registers,
means for forming in parallel the EXCLUSIVE-OR separate from the LOGICAL-AND of two numbers to be added and for storing the EXCLUSIVE-OR in said first register and said LOGICAL-AND in said second register,
means for shifting the LOGICAL-AND one place in the direction of higher order positions of said second register and for inserting a binary 0 in the least significant order of said second register as its content is shifted,
means for then inserting carries in a given order of said second register if the next lower order of said second register is storing a binary 1, or a binary 1 is being concurrently stored therein and the corresponding next lower order of said first register is storing a binary 1,
and means for finally forming the EXCLUSIVE-OR of said first and second registers to provide the sum.

No references cited.

ROBERT C. BAILEY, *Primary Examiner.*

G. D. SHAW, *Assistant Examiner.*